US012099266B2

(12) United States Patent
Kikuchi et al.

(10) Patent No.: US 12,099,266 B2
(45) Date of Patent: Sep. 24, 2024

(54) OPTICAL CIRCUIT WITH COMMON GROUND CONFIGURATION FOR RESISTORS AND THERMO-OPTIC PHASE SHIFTERS

(71) Applicant: Nippon Telegraph and Telephone Corporation, Tokyo (JP)

(72) Inventors: Kiyofumi Kikuchi, Musashino (JP); Ken Tsuzuki, Musashino (JP); Yusuke Nasu, Musashino (JP); Yuichiro Ikuma, Musashino (JP); Kotaro Takeda, Musashino (JP); Yuriko Kawamura, Musashino (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 275 days.

(21) Appl. No.: 17/620,007

(22) PCT Filed: Jun. 24, 2019

(86) PCT No.: PCT/JP2019/025016
§ 371 (c)(1),
(2) Date: Dec. 16, 2021

(87) PCT Pub. No.: WO2020/261349
PCT Pub. Date: Dec. 30, 2020

(65) Prior Publication Data
US 2022/0365377 A1    Nov. 17, 2022

(51) Int. Cl.
*G02F 1/01* (2006.01)
*G02F 1/025* (2006.01)
(Continued)

(52) U.S. Cl.
CPC .......... *G02F 1/0147* (2013.01); *G02F 1/025* (2013.01); *G02F 1/212* (2021.01); *G02F 1/2257* (2013.01)

(58) Field of Classification Search
CPC ........ G02F 1/025; G02F 1/212; G02F 1/2257; G02F 1/01; G02F 1/225; G02F 1/0147
See application file for complete search history.

(56) References Cited

U.S. PATENT DOCUMENTS 6,546,161 B2 *  4/2003  Okuno ............... G02B 6/12011
                                                  385/11
6,925,217 B2 *  8/2005  Yamazaki ............. G02F 1/0147
                                                  356/450
(Continued)

FOREIGN PATENT DOCUMENTS

JP    2007-78861 A    3/2007
JP    2007-114610 A   5/2007
JP    2009-162933 A   7/2009

*Primary Examiner* — Andrew Jordan
(74) *Attorney, Agent, or Firm* — Workman Nydegger

(57) ABSTRACT

An optical circuit of the present disclosure shares at least a part of an electrical path including phase variable means between neighboring optical interference circuits, or configures an electrical path so as to straddle neighboring optical interference circuits, thereby performing electrical or thermal feedback. The optical circuit includes a mechanism using the electrical or thermal feedback for cancelling components of thermal crosstalk from one optical interference circuit to another neighboring optical interference circuit. The optical circuit of the present disclosure has a resistor element that shares electrical paths including respective phase variable means between the neighboring optical interference circuits. The optical circuit changes the phase change amount by the phase variable means in the neighboring optical interference circuit, in such a way as to cancel the thermal crosstalk components by the resistor element.

10 Claims, 10 Drawing Sheets

(51) Int. Cl.
    *G02F 1/21*         (2006.01)
    *G02F 1/225*       (2006.01)

(56) References Cited

U.S. PATENT DOCUMENTS

| | | | |
|---|---|---|---|
| 9,519,115 B2* | 12/2016 | Yashiki | G02B 6/4207 |
| 10,078,253 B2* | 9/2018 | Hosokawa | G02F 1/035 |
| 10,142,711 B2* | 11/2018 | Dupuis | G02F 1/3136 |
| 10,248,002 B2* | 4/2019 | Nakamura | G02F 1/3138 |
| 10,268,232 B2* | 4/2019 | Harris | G06E 3/003 |
| 10,349,155 B2* | 7/2019 | Dupuis | H04Q 11/0005 |
| 10,545,292 B2* | 1/2020 | Takahashi | G02B 6/29355 |
| 10,674,239 B2* | 6/2020 | Dupuis | G02F 1/3136 |
| 10,743,092 B2* | 8/2020 | Dupuis | H04J 14/0212 |
| 10,768,659 B2* | 9/2020 | Carolan | G06E 3/006 |
| 11,334,107 B2* | 5/2022 | Carolan | G06N 3/04 |
| 2005/0100260 A1* | 5/2005 | Yamazaki | G02F 1/225 |
| | | | 385/5 |
| 2014/0169723 A1* | 6/2014 | Kato | H04B 10/548 |
| | | | 385/3 |
| 2016/0054529 A1* | 2/2016 | Yashiki | H01S 5/0064 |
| | | | 385/2 |
| 2017/0099529 A1* | 4/2017 | Dupuis | G02F 1/3136 |
| 2018/0017839 A1* | 1/2018 | Hosokawa | G02F 1/2255 |
| 2018/0084318 A1* | 3/2018 | Dupuis | H04Q 11/0005 |
| 2019/0033530 A1* | 1/2019 | Takahashi | G02B 6/356 |
| 2019/0037287 A1* | 1/2019 | Dupuis | H04J 14/0212 |
| 2019/0294199 A1* | 9/2019 | Carolan | G06E 3/008 |
| 2020/0145739 A1* | 5/2020 | Dupuis | H04Q 11/0005 |
| 2020/0379504 A1* | 12/2020 | Carolan | G06E 3/006 |
| 2022/0365377 A1* | 11/2022 | Kikuchi | G02F 1/01 |
| 2023/0213624 A1* | 7/2023 | Lin | G02B 6/02 |
| | | | 356/4.01 |

* cited by examiner

Fig. 3
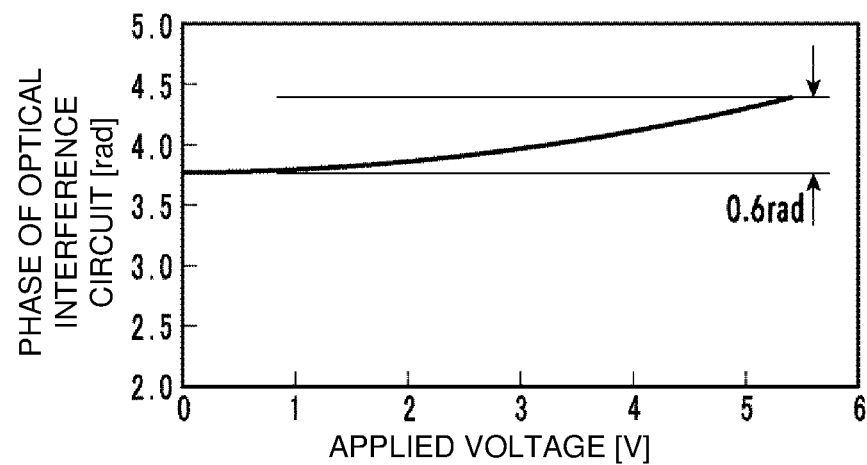
(a)
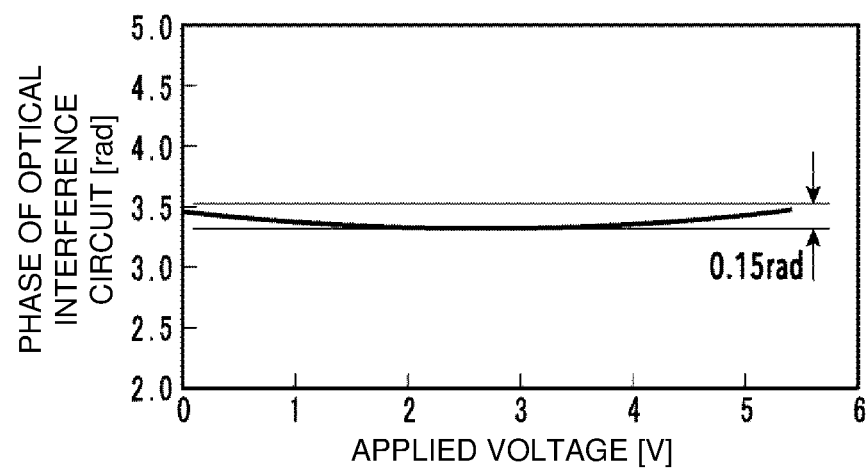
(b)

Fig. 8
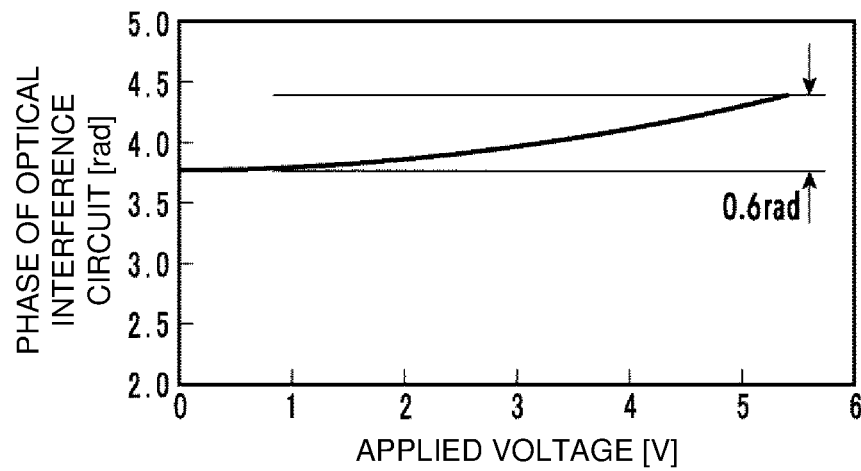
(a)
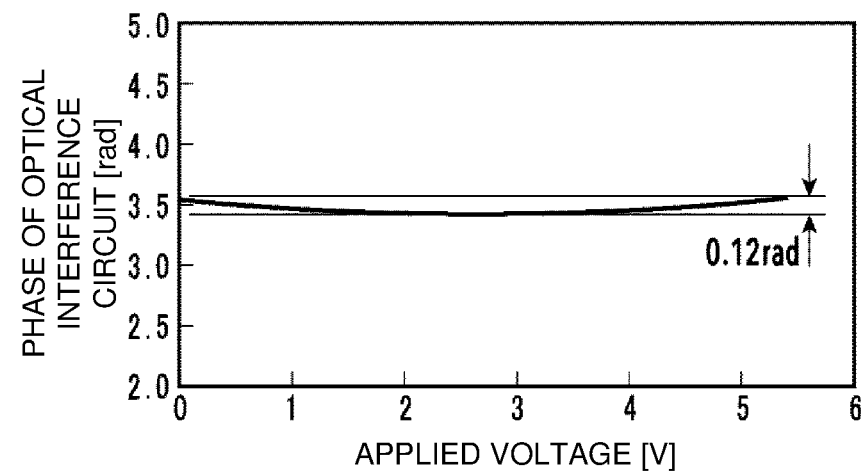
(b)

Fig. 10
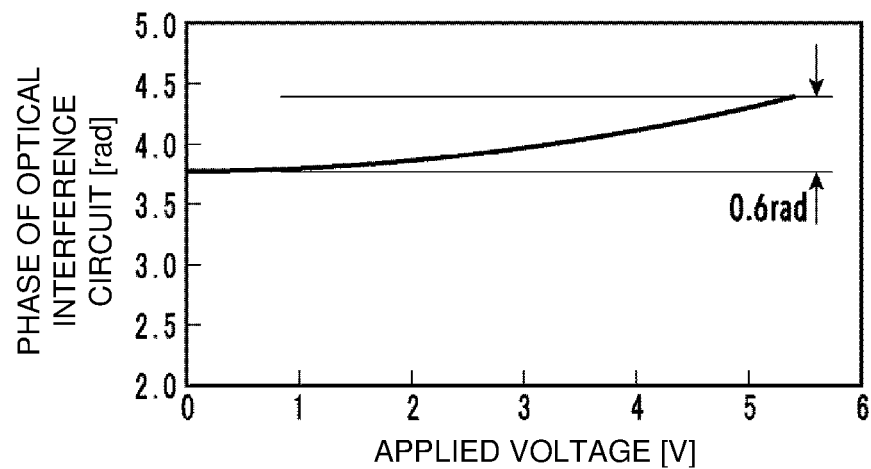
(a)
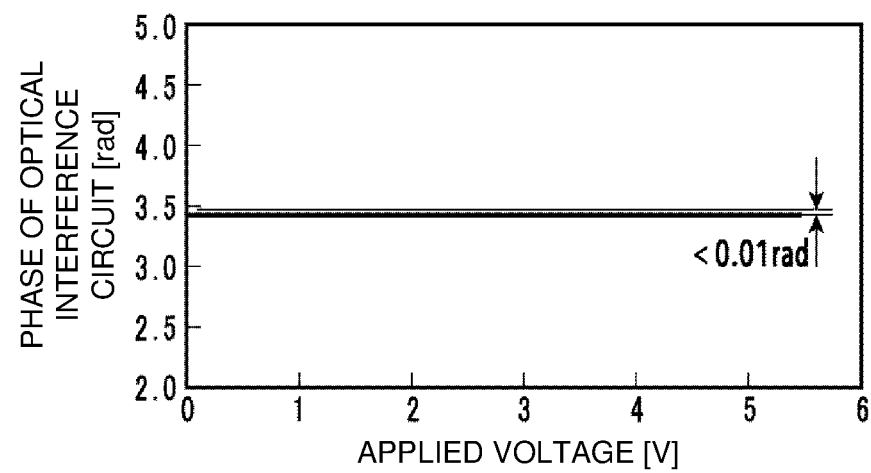
(b)

OPTICAL CIRCUIT WITH COMMON GROUND CONFIGURATION FOR RESISTORS AND THERMO-OPTIC PHASE SHIFTERS

TECHNICAL FIELD

The present invention relates to an optical circuit, and more particularly to an optical interference circuit in which thermal crosstalk is compensated.

BACKGROUND ART

The background of rapid increase in communication demands induces enthusiastic studies being conducted for capacity enlargement of communication networks. Amplitude shift keying (ASK) systems in which a high-frequency electric signal of one channel is allocated to one channel of an optical signal were the mainstream optical modulation format. However, in ASK, information that can be given to a signal in a certain frequency band is limited to only one bit. Therefore, in recent years, quadrature phase shift keying (QPSK) systems and quadrature amplitude modulation (QAM) systems have been actively researched and developed, and have been put into practical use. In general, in order to generate QPSK signals and QAM signals, the form of an IQ (quadrature) modulator is adopted, in which amplitude modulation is performed individually for each of the real axis (I-axis) and the imaginary axis (Q-axis) when light is expressed using complex numbers. This IQ modulator allocates high-frequency electric signals of two channels corresponding to the real axis and the imaginary axis for one-channel signal of an optical signal. In addition, polarization multiplexed systems in which separate signals are given to X-polarization and Y-polarization of the light and transmitted are also generally widely used.

In order to realize these modulation functions, an optical interferometer can be used as a fundamental optical circuit element. When IQ modulation and polarization multiplexing are used together to improve frequency use efficiency and enlarge communication capacity, an optical interferometer of at least four channels is required to give information for one channel of the optical signal.

It is effective to enlarge transmission capacity per unit volume by downsizing a transmission/reception device, while enlarging the communication capacity by increasing the frequency use efficiency as described above. Downsizing each device without changing the transmission capacity per device can increase the number of devices installable on a transmission system and can enlarge the transmission capacity of the transmission system.

CITATION LIST

Patent Literature

Patent Literature 1: Japanese Patent Laid-Open No. 2007-78861

SUMMARY OF THE INVENTION

Technical Problem

However, in optical transmission/reception devices of the transmission system, thermal crosstalk between optical interference circuits has been a problem. As disclosed in Patent Literature 1, when the number of channels of a high-frequency electric signal for one channel of light is increased and the optical transmission/reception devices are downsized, the distance between the optical interference circuits becomes shorter and the thermal crosstalk between the optical interference circuits becomes larger.

FIG. 1 is a diagram explaining thermal crosstalk between optical interference circuits according to a conventional technique. In FIG. 1, two optical interference circuits 101a and 101b are illustrated. In the optical interference circuit 101a, input light propagating in an input waveguide is branched into two arm waveguides, and two branched lights 11a are 11b are combined again to obtain output light 12. A thermo-optical phase shifter 102a is provided on one arm waveguide. A control voltage Vcont1 is applied to a voltage application terminal 103a so that current flows through the thermo-optical phase shifter 102a and heat generates, thereby changing the refractive index of the arm waveguide and shifting (changing) the phase of branched light 11b. Since a phase difference occurs between two branched lights 11a and 11b, the level of the combined output light 12 changes according to the phase difference. Similarly, in the other optical interference circuit 101b, a control voltage Vcont2 is applied to a voltage application terminal 103b so that the level of output light 14 can be controlled by a thermo-optical phase shifter 102b. Such optical interference circuits can be used as variable attenuators because the level of output light can be changed according to the applied voltage. Further, if another electrode capable of performing high-speed control is provided on the arm waveguide, each optical interference circuit of FIG. 1 can also be used as an element of an optical modulator in an optical transmission/reception device.

Opposite sides of the voltage application terminals of two thermo-optical phase shifters 102a and 102b are connected a common terminal 104. The usage of the common terminal 104 is to reduce the number of terminals as much as possible for downsizing of the optical circuit. Controlling the control voltages Vcont1 and Vcont2 by the configuration of FIG. 1 can cause each of the two optical interference circuits 101a and 101b to operate independently. However, in reality, the heat generated by one thermo-optical phase shifter 102a is transferred to the neighboring optical interference circuit 101b and affects the level of the output light 14 of the optical interference circuit 101b. Similarly, conversely, the heat generated by the thermo-optical phase shifter 102b is transferred to the optical interference circuit 101a and affects the level of the output light 12 of the optical interference circuit 101a. The phenomenon in which the heat generated by a thermo-optical phase shifter affects the operation of a neighboring optical interferometer is called thermal crosstalk. Downsizing the optical circuit and shortening the distance between optical interference circuits to enlarge the transmission capacity as described above raises a problem that the influence of the thermal crosstalk becomes larger. The optical interference circuit illustrated in FIG. 1 is densely used not only in optical attenuators but also in many optical transmission/reception devices in order to realize various signal processing functions. The thermal crosstalk affects performances of these devices.

The present invention has been made in view of the above-described problems, and intends to provide an optical circuit in which the thermal crosstalk is suppressed.

Means for Solving the Problem

One aspect of the present disclosure is an optical circuit including two or more neighboring optical interference circuits, characterized by including a first optical interference circuit including a first thermo-optical phase shifter having one end to which a first control voltage is applied, a second optical interference circuit neighboring the first optical interference circuit and including a second thermo-optical phase shifter having one end to which a second control voltage is applied, and a resistor element connected to the other end of the first thermo-optical phase shifter and the other end of the second thermo-optical phase shifter, through which a current from each of the first thermo-optical phase shifter and the second thermo-optical phase shifter flows toward a common potential.

Another aspect of the present disclosure is an optical circuit including two or more neighboring optical interference circuits, characterized by including a first optical interference circuit including a first thermo-optical phase shifter having one end to which a first control voltage is applied, a second optical interference circuit neighboring the first optical interference circuit and including a second thermo-optical phase shifter having one end to which a second control voltage is applied, a first resistor connected to the other end of the first thermo-optical phase shifter and arranged on a waveguide where the second thermo-optical phase shifter is not present, the waveguide being in the second optical interference circuit, and a second resistor connected to the other end of the second thermo-optical phase shifter and arranged on a waveguide where the first thermo-optical phase shifter is not present, the waveguide being in the first optical interference circuit.

Effects of the Invention

The present invention can reduce thermal crosstalk between multiple optical interference circuits densely arranged.

BRIEF DESCRIPTION OF DRAWINGS

FIG. 3 is an explanatory diagram illustrating thermal crosstalk suppression effects in the optical circuit of the first embodiment.

FIG. 8 is an explanatory diagram illustrating thermal crosstalk suppression effects in the optical circuit of the second embodiment.

FIG. 10 is an explanatory diagram thermal crosstalk suppression effects in the optical circuit of the third embodiment.

DESCRIPTION OF EMBODIMENTS

The optical circuit of the present disclosure shares at least a part of an electrical path including phase variable means between neighboring optical interference circuits, or configures an electrical path straddling neighboring optical interference circuits to perform voltage feedback or thermal feedback. Further, the optical circuit of the present disclosure includes a mechanism for canceling thermal crosstalk components from one optical interference circuit to a neighboring optical interference circuit by voltage feedback or thermal feedback.

The optical circuit of the present disclosure has a feedback resistor that shares electrical paths including respective phase variable means between neighboring optical interference circuits. Further, the optical circuit of the present disclosure changes the phase changeable amount by the phase variable means in the neighboring optical interference circuit, in such a way as to cancel the thermal crosstalk components by the feedback resistor. At this time, voltage feedback is generated for the voltage applied to the phase variable means of the neighboring optical interference circuit that is subjected to the thermal crosstalk.

The other optical circuit of the present disclosure includes an electrical path including the phase variable means that is configured to straddle neighboring optical interference circuits. Further, this optical circuit changes the substantial phase changeable amount in the neighboring optical interference circuit, so as to cancel thermal crosstalk components by the heat generation of a resistor element arranged on the neighboring optical interference circuit. At this time, thermal feedback is generated for the neighboring optical interference circuit that is subjected to the thermal crosstalk. The above-described phase variable means may be a thermo-optical phase shifter. Further, the above-described optical interference circuit may be a Mach-Zehnder interferometer (MZI) or a ring-type optical interference circuit. Moreover, multiple optical interference circuits of the optical circuit of the present disclosure may be arranged in an array.

Hereinafter, configurations and operations of the optical circuit of the present disclosure will be described in detail together with specific embodiments and modified examples thereof.

First Embodiment

Figure 1:
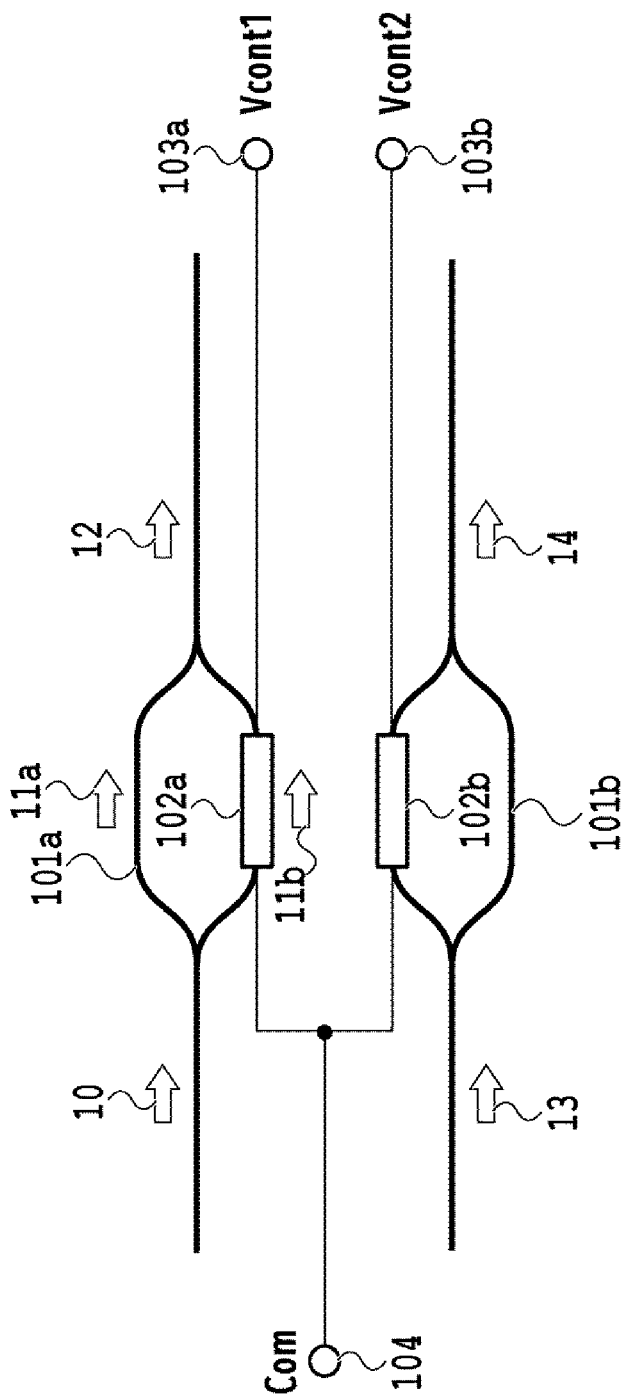
FIG. 1 is a diagram explaining thermal crosstalk between optical interference circuits according to a conventional technique.
Figure 2:
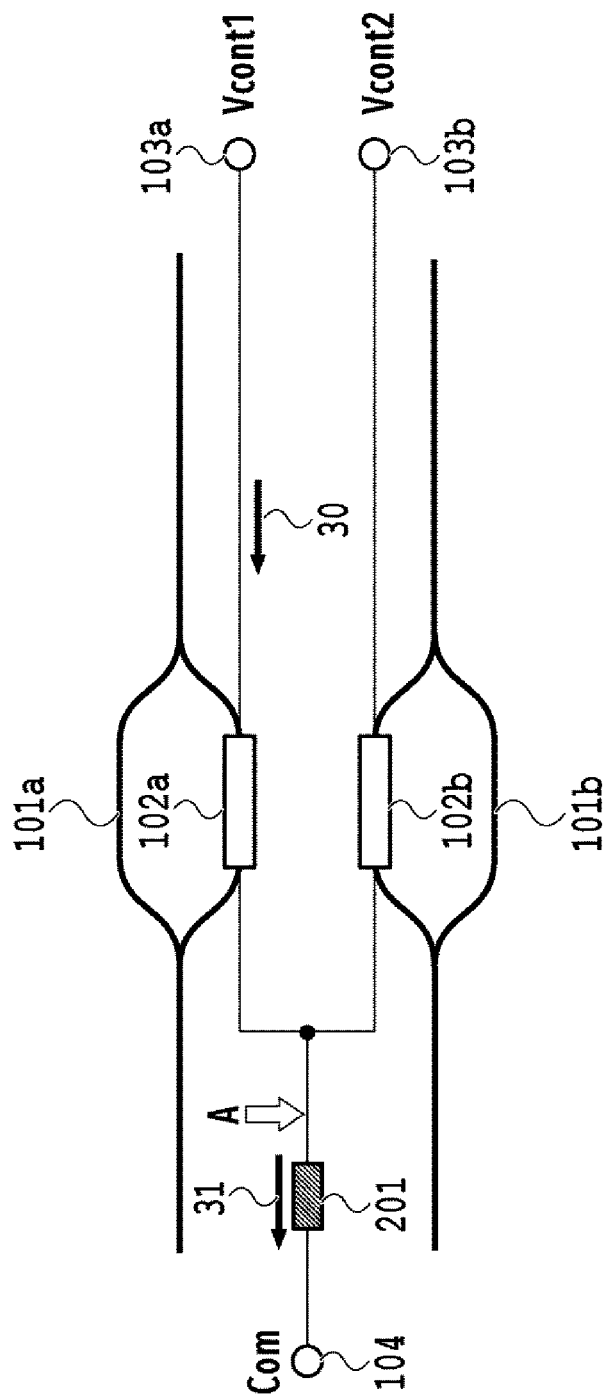
FIG. 2 is a configuration diagram illustrating an optical circuit of a first embodiment of the present disclosure.

FIG. 2 is a configuration diagram illustrating an optical circuit according to the first embodiment of the present disclosure. In the optical circuit of FIG. 2, the simplest configuration for reducing thermal crosstalk between two optical interference circuits 101a and 101b will be described. Two optical interference circuits 101a and 101b are the same in configuration as those illustrated in FIG. 1. Each optical interference circuit includes, on one arm waveguide, phase variable means for changing the phase of light propagating in the arm waveguide by temperature change. The optical interference circuit illustrated in FIG. 2 is known as MZI type interference circuit. Specifically, the phase variable means may be thermo-optical phase shifters 102a and 102b. It should be noted that the two thermo-optical phase shifters 102a and 102b are provided on neighboring arm waveguides of the two optical interference circuits. That is, the two thermo-optical phase shifters are constituted by the thermo-optical phase shifter 102a provided on the lower arm waveguide of the first optical interference circuit 101a and the thermo-optical phase shifter 102b provided on the upper arm waveguide of the second optical interference circuit 101b in the drawing.

The two optical interference circuits 101a and 101b of FIG. 2 include voltage application terminals 103a and 103b, respectively, and are similar in configuration to the optical circuit of FIG. 1. That is, independently operating control voltages Vcont1 and Vcont2 are applied to corresponding voltage application terminals. In the optical circuit of the present disclosure, two electrical paths extending from respective voltage application terminals 103a and 103b to a common terminal 104 are different in configuration from those of the conventional technique illustrated in FIG. 1. In the conventional optical interference circuit of FIG. 1, the electrical paths from respective voltage application terminals 103a and 103b to the common terminal 104 are only common in the final common terminal 104, and there is no other common part. Normally, the common terminal is connected to a voltage source having a low impedance and a constant electric potential so that the control voltages Vcont1 and Vcont2 can be effectively applied to the thermo-optical phase shifters 102a and 102b, respectively. In the simplest configuration, the common terminal 104 is grounded. Accordingly, the control voltages Vcont1 and Vcont2 give no adverse influence to each other, and the two electrical paths operate independently.

In the optical circuit of the present disclosure illustrated in FIG. 2, a common resistor element 201 is provided between one end of the thermo-optical phase shifters 102a and 102b to the common terminal 104. Accordingly, a first electrical path is formed so as to extend from the voltage application terminal 103a to the common terminal 104 via the thermo-optical phase shifter 102a and resistor element 201. Similarly, a second electrical path is formed so as to extend from the voltage application terminal 103b to the common terminal 104 via the thermo-optical phase shifter 102b and the resistor element 201. The resistor element 201 is an overlapping part, or a shared part, between the two electrical paths. The resistor element 201 has a function of reducing thermal crosstalk components as described below.

The optical circuit of FIG. 2 is the one formed on a wafer (SOI: Silicon on Insulator) in which a silicon monocrystal is formed on a silicon oxide film. In the optical waveguide layer configuring the optical interference circuits 101a and 101b, the material of the core is silicon and the clad is configured by a glass film. The material used for the thermo-optical phase shifters 102a and 102b is titanium nitride formed on the optical waveguide layer. Similar to the thermo-optical phase shifters, the resistor element 201 is made of titanium nitride. As for the electrical paths, the wiring used for respective electric connections between the voltage application terminals 103a and 103b, the thermo-optical phase shifters 102a and 102b, the resistor element 201, and the common terminal 104 is aluminum wiring.

The resistance value of the thermo-optical phase shifters 102a and 102b is 500Ω. The resistance value of the resistor element 201 is 23Ω. The π shift power of the thermo-optical phase shifters 102a and 102b is 15 mW. Further, the distance between the two arm waveguides in which the thermo-optical phase shifters 102a and 102b are present is 100 µm. Here, in the conventional configuration of FIG. 1 using exactly the same materials and the arrangement of the optical interference circuits, the amount of thermal crosstalk from the thermo-optical phase shifter 102a to the optical interference circuit 101b was found to be 5%. The amount of thermal crosstalk is the ratio of the amount of phase change in a desired optical interference circuit due to heat generation of a certain thermo-optical phase shifter to the amount of phase change caused by thermal crosstalk in a neighboring another optical interference circuit. For example, the ratio of the above phase change amounts is the ratio of α1 to α2 when α1° represents a phase difference between arm waveguides caused by a constant heat generation amount in one optical interferometer, and α2° represents a phase difference between arm waveguides in the other optical interferometer. Since the two optical interference circuits are used for independent purposes, it is desirable that α2=0° and the thermal crosstalk amount is 0%. However, downsizing the entire optical circuit requires densely arranging multiple optical interference circuits. Therefore, in general, when the distance between the optical interference circuits is closer, the heat is easily transferred, and the amount of thermal crosstalk increases.

The optical interference circuit of the present disclosure has a feedback resistor, that is resistor element 201, which shares an electrical path including each phase variable means, between two neighboring optical interference circuits. Here, as the simplest example, an operation for reducing the thermal crosstalk between neighboring optical interference circuits by the feedback resistor 201 will be described. Respective control voltages Vcont1 and Vcont2 to be applied to the voltage application terminals 103a and 103b are independently controlled. Hereinafter, the thermal crosstalk from the thermo-optical phase shifter 102a to the optical interference circuit 101b when the control voltage Vcont1 to the voltage application terminal 103a is changed and the control voltage Vcont2 to the voltage application terminal 103b is kept constant will be described. The common terminal 104 is connected to the ground. Raising the control voltage Vcont1 of the voltage application terminal 103a increases the heat generation in the thermo-optical phase shifter 102a. Therefore, the amount of thermal crosstalk from the thermo-optical phase shifter 102a to the optical interference circuit 101b also increases. However, at the same time, current 30 flowing through the thermo-optical phase shifter 102a increases, and therefore the potential difference generated between both ends of the resistor element 201 becomes larger. Since the voltage Vcont2 applied to the voltage application terminal 103b is constant, the voltage applied between both ends of the thermo-optical phase shifter 102b on the thermal crosstalk receiving side becomes smaller, as a result, and the heat generation thereof also becomes smaller.

As described above, in the two electrical paths extending from respective voltage application terminals to the common terminal, providing the resistor element 201 in the common electrical path on the common terminal side of the thermo-optical phase shifter can give a negative feedback to the voltage substantially applied to the thermo-optical phase shifter 102b. The increase in phase change of the thermo-optical phase shifter 102b due to the thermal crosstalk from the thermo-optical phase shifter 102a and the reduction in phase change due to the reduction in the voltage applied to the thermo-optical phase shifter 102b (reduction in heat generation) are cancelled with each other. As a result, the adverse influence of thermal crosstalk on the neighboring optical interference circuit 101b is reduced.

Accordingly, the optical circuit of the present disclosure is the optical circuit including two or more neighboring optical interference circuits which includes the first optical interference circuit 101a and the second optical interference circuit 101b, and can be implemented as the optical circuit including the resistor element 201. The first optical interference circuit 101a includes the first thermo-optical phase shifter 102a having one end to which the first control voltage is applied. The second optical interference circuit 101b neighbors the first optical interference circuit and includes the second thermo-optical phase shifter 102b having one end to which the second control voltage is applied. The resistor element 201 is connected to the other end of the first thermo-optical phase shifter and the other end of the second thermo-optical phase shifter, and current 3I flows toward the common potential 104 from each of the first thermo-optical phase shifter and the second thermo-optical phase shifter. The above-described resistor element is a single resistor 201. The first electrical path between the first control voltage Vcont1 and the common potential Com and the second electrical path between the second control voltage Vcont2 and the common potential Com can be shared by the single resistor.

FIG. 3 is a diagram illustrating effects of suppressing thermal crosstalk between the optical interference circuits in the optical circuit of the first embodiment. FIG. 3(a) illustrates thermal crosstalk characteristics in the conventional optical interference circuits illustrated in FIG. 1. FIG. 3(b) illustrates thermal crosstalk characteristics between optical interference circuits in the optical circuit according to the first embodiment of FIG. 2. Each graph indicates influences of the control voltage Vcont1 on phase characteristics of the neighboring optical interference circuit 101b, when the control voltage Vcont1 of the voltage application terminal 103a is changed (horizontal axis) and the voltage Vcont2 of the voltage application terminal 103b is kept at constant value of 3 V. The vertical axis represents the phase of the thermo-optical phase shifter 102a of the neighboring optical interference circuit 101b, on the output side.

In an ideal state with no thermal crosstalk, the phase of the neighboring optical interference circuit 101b should be constant regardless of the control voltage Vcont1 of the voltage application terminal 103a. In reality, as illustrated in FIG. 3(a), in a region where the control voltage Vcont1 is larger, the phase of the neighboring optical interference circuit 101b causes a deviation of 0.6 rad (corresponding to thermal crosstalk 5%) due to the influence of thermal crosstalk. On the other hand, the optical circuit of the first embodiment illustrated in FIG. 3(b) suppresses the deviation amount in phase of the neighboring optical interference circuit 101b to 0.15 rad (corresponding to thermal crosstalk 1.25%). As described above, the optical circuit of the first embodiment is provided with the resistor element 201 in the common electrical path on the common terminal side of the thermo-optical phase shifter, between the neighboring optical interference circuits, and gives a negative feedback to the substantial voltage applied to the neighboring thermo-optical phase shifter so as to suppress the thermal crosstalk.

In the optical circuit of the first embodiment, as waveguide materials, silicon is used as the core of an optical waveguide formed on an SOI wafer, and glass is used as the clad. This is because the difference in refractive index between the core and the clad of the optical waveguide is large, which is suitable for downsizing of the optical circuit. However, the waveguide of the optical circuit of the present disclosure is not limited to the above-mentioned materials. For example, quartz glass-based materials and lithium niobate-based materials may be used. III-V semiconductor-based materials such as indium phosphor may also be used.

In the optical circuit of FIG. 2, the material used for the resistor element is titanium nitride that is generally used for silicon-based waveguides. However, the resistor element of the optical circuit of the present disclosure is not limited to the above-mentioned materials. The resistor element may be a resistor formed by ion-implanting silicon, aluminum wiring arranged thin and long, or a chip component mounted on a substrate.

First Modified Example of First Embodiment

Figure 4:
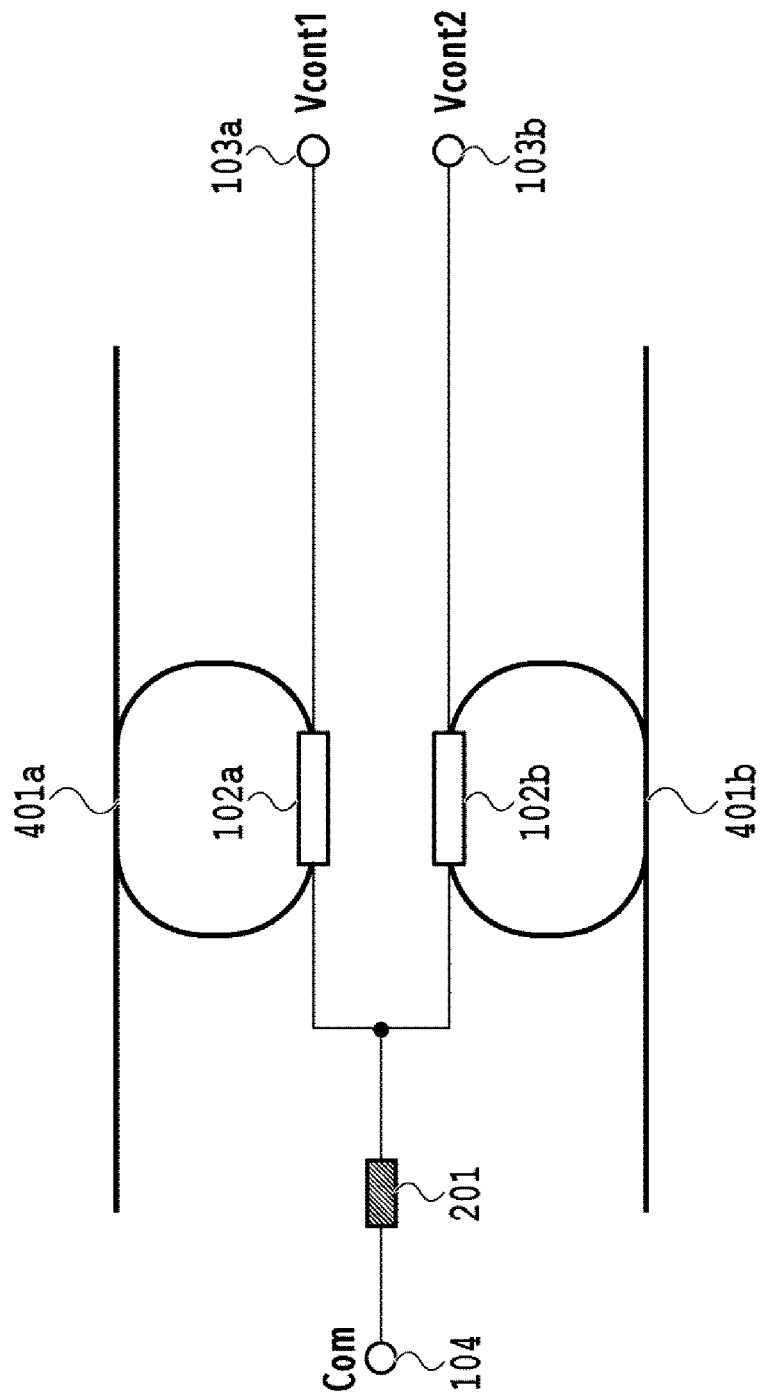
FIG. 4 is a configuration diagram illustrating a first modified example of the optical circuit of the first embodiment.

FIG. 4 illustrates a configuration of a first modified example of the optical circuit of the first embodiment. The optical circuit of the first modified example uses ring-type optical interference circuits 401 and 401b as optical interference circuits. This arrangement is obtainable by replacing the two MZI type optical interference circuits in the configuration of the first embodiment of FIG. 2 by the ring-type optical interference circuits 401 and 401b. Two phase variable means, i.e., thermo-optical phase shifters 102a and 102b, are provided on neighboring ring parts of two neighboring ring-type optical interferometers, respectively. In order to control the phases of the thermo-optical phase shifters 102a and 102b, control voltages Vcont1 and Vcont2 are independently applied to voltage application terminals 103a and 103b, respectively. A resistor element 201 is provided on a common path part of two electrical paths extending from respective voltage application terminals 103a and 103b to a common terminal 104. Similar to the first embodiment, between two neighboring optical interference circuits 401a and 401b, a feedback resistor 201 that shares electrical paths including respective phase variable means is provided. The configuration of the two electrical paths in the first modified example is exactly the same as that of the first embodiment illustrated in FIG. 2. This configuration has effects of suppressing thermal crosstalk similar to the reduction of phase change illustrated in FIG. 3.

Second Modified Example of First Embodiment

Figure 5:
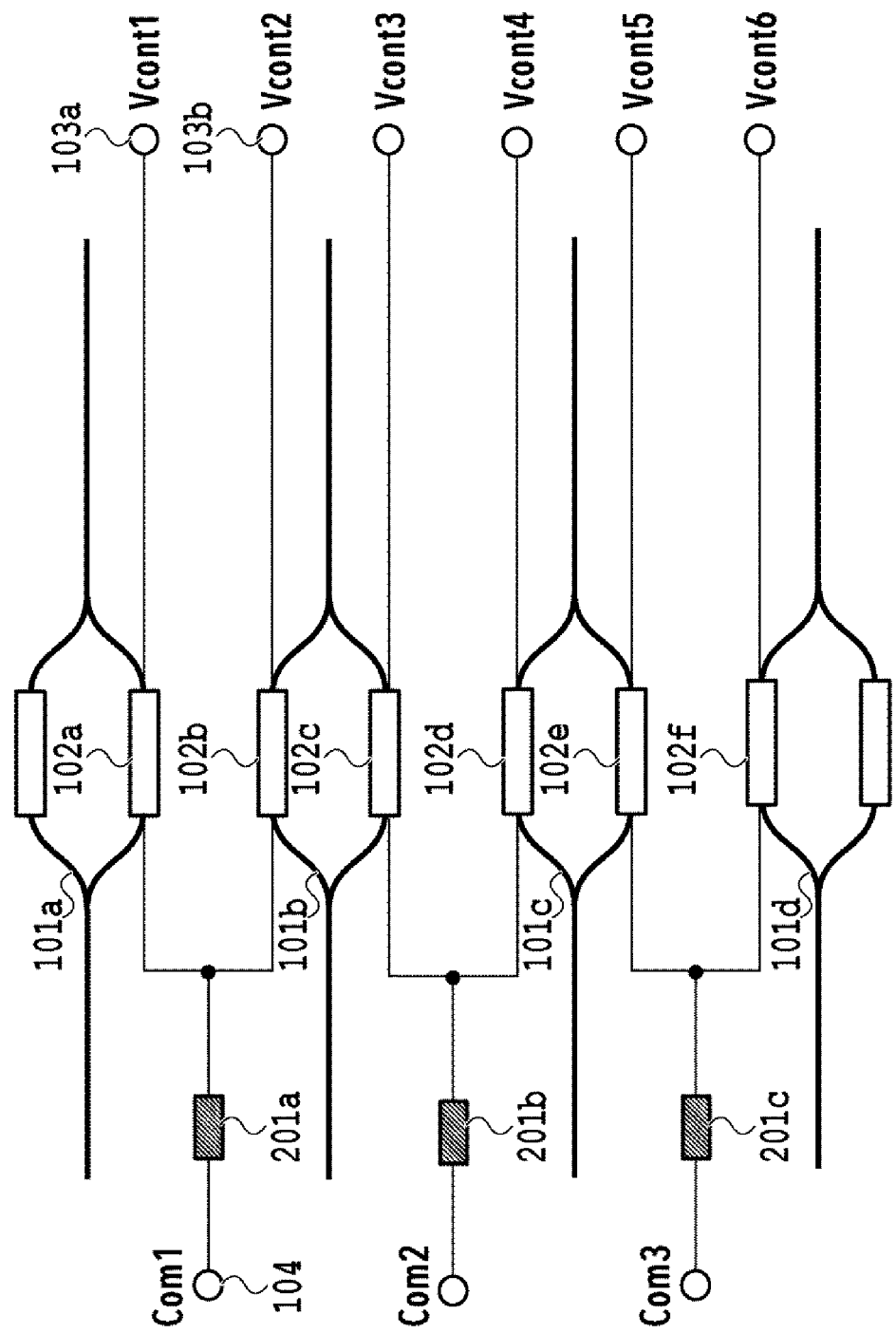
FIG. 5 is a configuration diagram illustrating a second modified example of the optical circuit of the first embodiment.

FIG. 5 is a configuration diagram illustrating a second modified example of the optical circuit of the first embodiment. The optical circuit of the second modified example is different from the configuration of the two optical interference circuits 101a and 101b of the first embodiment illustrated in FIG. 2, in that the number of parallel circuits is increased to 4. In FIG. 5, optical interference circuits 101a to 101d are provided with thermo-optical phase shifters 102a to 102f, respectively, on both of two arm waveguides. In two neighboring optical interference circuits, resistor elements 201a to 201c are provided on common electrical paths, on the common terminal side of the thermo-optical phase shifter, in two electrical paths each including neighboring thermo-optical phase shifters. In any combination of two neighboring optical interference circuits, the resistor elements 201a to 201c of the common electrical paths reduce the substantial application voltages applied to the thermo-optical phase shifters of the neighboring optical interference circuits. The feedback reduces the thermal crosstalk that may be received by one of the optical interference circuits. For example, the thermal crosstalk between the two optical interference circuits 101c and 101d is reduced by the resistor element 201c that shares two electrical paths extending from common terminals of control voltages VCont5 and VCont6 to common potential Com3.

In the configuration of the optical circuit illustrated in FIG. 5, the second optical interference circuit 101b from the top can use control voltage Vcont2 or Vcont3 to control the phase of the corresponding thermo-optical phase shifter 102b or 102c. Further, the third optical interference circuit 101c can use control voltage Vcont4 or Vcont5 to control the phase of the corresponding thermo-optical phase shifter 102d or 102e. Accordingly, for the second optical interference circuit 101b, only the control voltage Vcont2 may be changed to control the level of output light, or both the control voltages Vcont2 and Vcont3 may be controlled in a differential way. At this time, the resistor element 201b reduces the thermal crosstalk between the second optical interference circuit 101b and the third optical interference circuit 101c. Similarly, the resistor element 201c reduces the thermal crosstalk between the third optical interference circuit 101c and the fourth optical interference circuit 101d.

Even in the configuration of the optical circuit of FIG. 5 in which the number of parallel optical interference circuits is increased, thermal crosstalk suppression effects can be exerted between two neighboring optical interference circuits arbitrarily combined, similar to the optical circuit the first embodiment illustrated in FIG. 2.

Third Modified Example of First Embodiment

Figure 6:
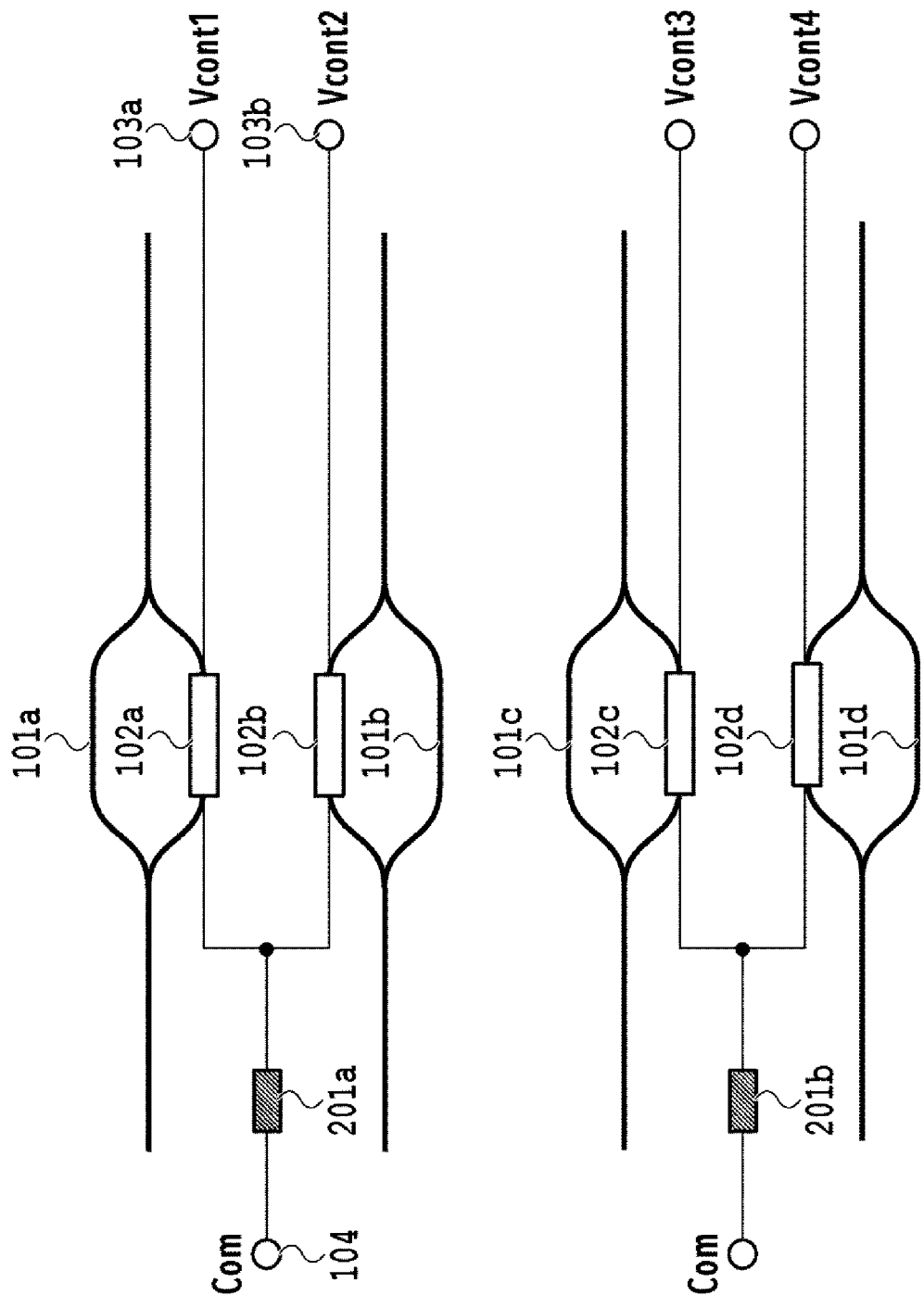
FIG. 6 is a configuration diagram illustrating a third modified example of the optical circuit of the first embodiment.

FIG. 6 is a configuration diagram illustrating a third modified example of the optical circuit of the first embodiment. The optical circuit of the third modified example of FIG. 6 is configured to have four optical interference circuits arranged in parallel like the second modified example of FIG. 5. As differences from the second modified example of FIG. 5, provision of thermo-optical phase shifters 102a to 102d is limited to only one arm waveguide in respective of optical interference circuit 101a to 101d. That is, in two optical interference circuits 101a and 101b, thermo-optical phase shifters 102a and 102b are arranged on neighboring arm waveguides. In another two optical interference circuits 101c and 101d, thermo-optical phase shifters 102c and 102d are arranged on neighboring arm waveguide. Accordingly, thermal crosstalk suppression effects can be exerted not only between the two optical interference circuits 101a and 101b but also between the two optical interference circuits 101c and 101d, similar to the first embodiment illustrated in FIG. 2.

The optical circuit of the third modified example is characterized, compared to the configuration of the second modified example illustrated in FIG. 5, in that the number of required thermo-optical phase shifters is halved and the phase adjustment in each optical interference circuit is simple. Although no thermal crosstalk suppression effects can be expected between the second optical interference circuit 101b and the third optical interference circuit 101c, the influence of thermal crosstalk is definitely minor because the thermo-optical phase shifter 102b of the optical interference circuit 101b and the thermo-optical phase shifter 102c of the optical interference circuit 101c are not positioned adjacently. Accordingly, compared to the second modified example of FIG. 5, the optical circuit of the third modified example illustrated in FIG. 6 is simple in configuration and brings, as the entire optical circuit, comparable thermal crosstalk reductions.

Second Embodiment

According to the above-described first embodiment and three modified examples thereof, the feedback resistor sharing two electrical paths each including the phase variable means is used, between two optical interference circuits, to perform feedback for reducing the voltage substantially applied to the thermo-optical phase shifters of neighboring optical interference circuits. Such thermal crosstalk reduction feedback can be realized not only by voltage feedback to the thermo-optical phase shifters but also thermal feedback to the thermo-optical phase shifters. This can be realized by configuring the electrical path for controlling the phase of the first optical interference circuit that gives thermal crosstalk so as to straddle the first optical interference circuit and the second optical interference circuit that is subjected to the thermal crosstalk, and by arranging the thermal feedback giving resistor in the second optical interference circuit.

Figure 7:
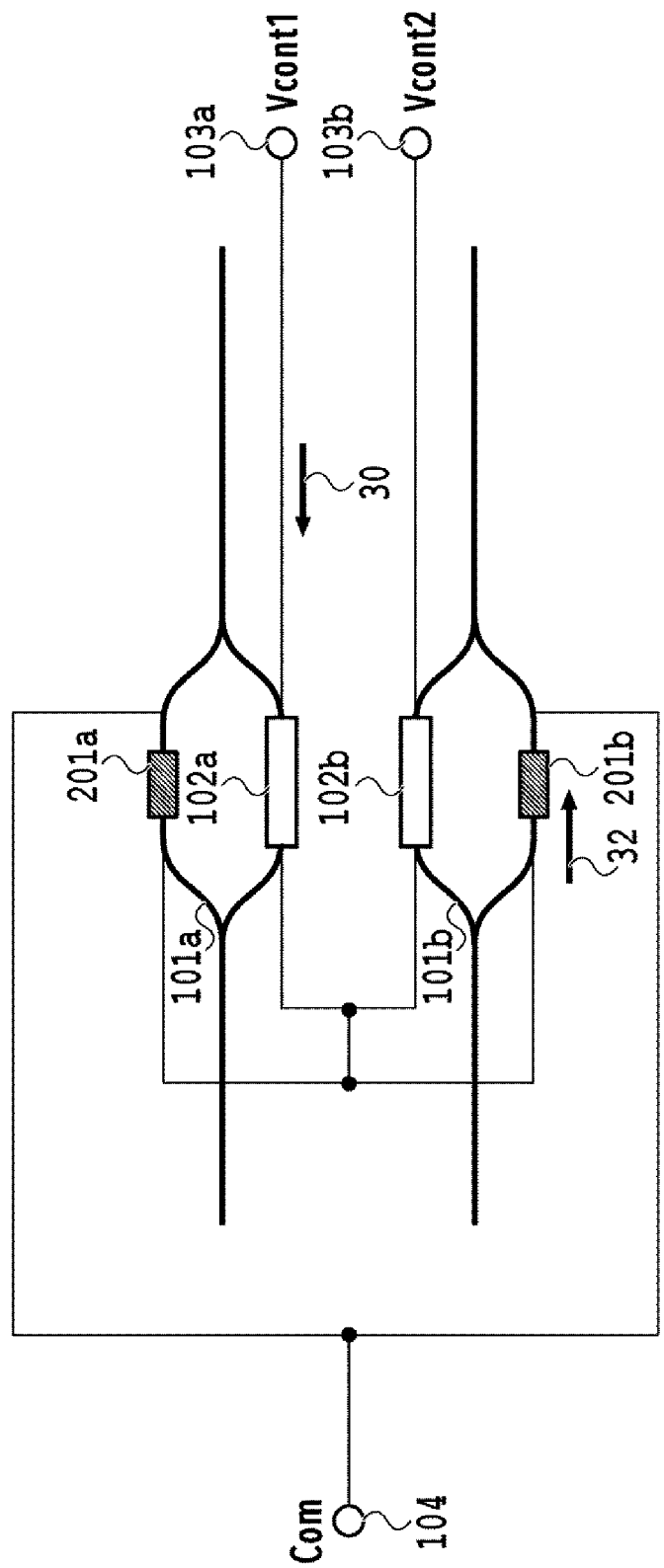
FIG. 7 is a configuration diagram illustrating an optical circuit of a second embodiment of the present disclosure.

FIG. 7 is a configuration diagram illustrating an optical circuit of the second embodiment of the present disclosure. The optical circuit of the second embodiment is similar to the first embodiment illustrated in FIG. 2 in that two optical interference circuits 101a and 101b are provided. Here, a configuration for reducing thermal crosstalk between the two optical interference circuits 101a and 101b will be described. Specifically, phase variable means may be thermo-optical phase shifters 102a and 102b. Similar to the case of FIG. 2, the two thermo-optical phase shifters 102a and 102b are provided on neighboring arm waveguides of the two optical interference circuits. That is, in the drawing of the first optical interference circuit 101a, the thermo-optical phase shifter 102a is provided on a lower arm waveguide. In the drawing of the second optical interference circuit 101b, the thermo-optical phase shifter 102b is provided on an upper arm waveguide. The difference from the conventional technique illustrated in FIG. 1 and the first embodiment illustrated in FIG. 2 is present in the configuration of two electrical paths extending from respective voltage application terminals 103a and 103b to a common terminal 104, which respectively include the thermo-optical phase shifters 102a and 102b.

The first electrical path for controlling the phase of the upper first optical interference circuit 101a, that is, the first electrical path extending from the voltage application terminal 103a for the thermo-optical phase shifter to the common terminal 104, will be described. The voltage application terminal 103a is connected to one end of the thermo-optical phase shifter 102a, and is branched from the other end of the thermo-optical phase shifter 102a into two electrical paths, one of which extends to a resistor element 201b formed in the second optical interference circuit 101b and the other extends to one end of a resistor element 201a formed in the first optical interference circuit 101a. The two resistor elements 201a and 201b are connected, at the other end thereof, to the common terminal 104.

The second electrical path for controlling the phase of the lower second optical interference circuit 101b, that is, the second electrical path extending from the voltage application terminal 103b for the thermo-optical phase shifter to the common terminal 104, has the same configuration as the above-described first electrical path, except that the voltage application terminal 103b is connected to the thermo-optical phase shifter 102b. Here, it should be noted that, in FIG. 7, the two thermo-optical phase shifters 102a and 102b are connected to each other on the common terminal 104 side. The thermo-optical phase shifter and the common terminal 104 are equivalently connected in parallel by two parallel resistor elements 201a and 201b. That is, two separate resistors are arranged on arm waveguides not having the first thermo-optical phase shifter 102a and the second thermo-optical phase shifter 102b. If it is regarded as including "one resistor element" having a parallel resistance value of the parallel resistors 201a and 201b, the two electrical paths of FIG. 7 can be considered as completely identical, in electric circuit configuration, to the configuration of the two electrical paths illustrated in FIG. 2. Accordingly, similar to the optical circuit of the first embodiment, even in the configuration of FIG. 7, electric potential changes of two parallel resistors 201a and 201b give an electric voltage feedback to the application voltage substantially applied to the thermo-optical phase shifters of neighboring optical interference circuits.

In addition to the above-described electric voltage feedback, the configuration of the second embodiment illustrated in FIG. 7 gives a thermal feedback by configuring in such a manner that the resistor element is physically separated into two resistors and are provided on the arm waveguides having no thermo-optical phase shifter. For example, the electrical path for controlling the phase of the first optical interference circuit 101a will be described. Similar to the examination in the FIG. 2, the thermal crosstalk from the thermo-optical phase shifter 102a to the second optical interference circuit 101b when the control voltage Vcont1 of the voltage application terminal 103a is changed and the voltage Vcont2 of the voltage application terminal 103b is kept constant will be described. When the control voltage Vcont1 of the voltage application terminal 103a is increased, heat generation by the thermo-optical phase shifter 102a increases. Therefore, the amount of thermal crosstalk from the thermo-optical phase shifter 102a to the second optical interference circuit 101b increases. However, at the same time, current 30 flowing through the thermo-optical phase shifter 102a increases, and therefore the amount of heat generated by the resistor 201b of the second optical interference circuit 101b increases correspondingly.

The phase change amount due to the thermo-optical phase shifter in the optical interference circuit is determined by the phase difference between two arm waveguides. Accordingly, if the phases of the two arm waveguides change in the same direction at the same time, the phase difference contributing to a phase interference operation of the optical interference circuit will be consequently cancelled with each other and will be reduced. In other words, when a phase change generated by thermal crosstalk from the thermo-optical phase shifter 102a to the second optical interference circuit 101b and a phase change generated due to heat generation of the resistor 201b of the second optical interference circuit 101b are in the same direction, the phase difference between arm waveguides of the second optical interference circuit 101b on the thermal crosstalk receiving side decreases, as a whole. Accordingly, the thermal crosstalk received by the neighboring second optical interference circuit is cancelled and reduced by the thermal feedback given by the resistor in the arm waveguide on the side opposite to the thermo-optical phase shifter.

At this time, it should be noted that, even in the first optical interference circuit 101a on the thermal crosstalk giving side, the resistor element 201a in the arm waveguide on the side opposite to the thermo-optical phase shifter 102a may generate heat similarly. However, this heat generation has only a limited influence of slightly reducing the phase change amount by the control voltage Vcont1 to the voltage application terminal 103a. The similar thermal crosstalk reduction operation by thermal feedback also holds for thermal crosstalk from the thermo-optical phase shifter 102b to the first optical interference circuit 101a. The two electrical paths extending from respective voltage application terminals 103a and 103b to the common terminal 104 are linear electric circuits composed of only resistor elements, and their operations are independent according to the control voltages applied to the corresponding voltage application terminals and are superposed.

Accordingly, in the optical circuit of the present disclosure, the resistor elements are two resistors 201a and 201b arranged on the waveguides where the first thermo-optical phase shifter and the second thermo-optical phase shifter are not present, respectively. The two resistors share the first electrical path extending from the first control voltage Vcont1 to the common potential Com and the second electrical path extending from the second control voltage Vcont2 to the common potential Com.

Configuring the two electrical paths of the optical circuit illustrated in FIG. 7 enables the two parallel feedback resistors sharing the two electrical paths to realize the voltage feedback by the application voltage applied to the thermo-optical phase shifter and the thermal feedback, at the same time. This can be realized by configuring the electrical path for controlling the phase of the first optical interference circuit that gives thermal crosstalk so as to straddle the first optical interference circuit and the second optical interference circuit that is subjected to the thermal crosstalk, and by arranging the thermal feedback giving resistor in the second optical interference circuit.

Each of the thermo-optical phase shifters 102a and 102b has a resistance value of 500Ω. Each of the resistor elements 201a and 201b has a resistance value of 12Ω. Further, each of the thermo-optical phase shifters 102a and 102b has a π shift power of 15 mW. The amount of thermal crosstalk from the thermo-optical phase shifter 102a to the second optical interference circuit 101b is 5%.

FIG. 8 is a diagram illustrating effects of suppressing thermal crosstalk between the optical interference circuits in the optical circuit of the second embodiment. FIG. 8(a) indicates the thermal crosstalk characteristics in the conventional optical interference circuit illustrated in FIG. 1, and FIG. 8(b) indicates thermal crosstalk characteristics in the optical circuit of the second embodiment illustrated in FIG. 7. Each graph indicates influences of the control voltage Vcont1 on phase characteristics of the neighboring optical interference circuit 101b, when the control voltage Vcont1 of the voltage application terminal 103a is changed (horizontal axis) and the voltage Vcont2 of the voltage application terminal 103b is kept at constant value of 3 V. The vertical axis represents the phase of the thermo-optical phase shifter 102a of the neighboring optical interference circuit 101b, on the output side.

In an ideal state with no thermal crosstalk, the phase of the neighboring optical interference circuit 101b should be constant regardless of the control voltage Vcont1 of the voltage application terminal 103a. In reality, as illustrated in FIG. 8(a), in a region where the control voltage Vcont1 is large, the phase of the neighboring optical interference circuit 101b causes a deviation of 0.6 rad (corresponding to thermal crosstalk 5%) due to the influence of thermal crosstalk. On the other hand, the optical circuit of the second embodiment illustrated in FIG. 8(b) suppresses the deviation amount in phase of the neighboring optical interference circuit 101b to 0.12 rad (corresponding to thermal crosstalk 1%). As describe above, the optical circuit of the second embodiment is provided with two resistors 201a and 201c arranged on arm waveguides having no thermo-optical phase shifter, respectively, which are parallelly connected resistors in the common electrical path on the common terminal side of the thermo-optical phase shifter, in two neighboring optical interference circuits, and give a negative thermal feedback to reduce the phase change amount for neighboring thermo-optical phase shifters, in addition to the negative voltage feedback for substantial application voltage applied to of the neighboring thermo-optical phase shifter, so as to suppress the thermal crosstalk between the neighboring optical interference circuits.

Third Embodiment

According to the above-described optical circuit of the second embodiment, the electrical path for controlling the phase of the first optical interference circuit that gives thermal crosstalk is realized by configuring it so as to straddle the first optical interference circuit and the second optical interference circuit that is subjected to the thermal crosstalk and arranging the thermal feedback giving resistor in the second optical interference circuit. The two electrical paths in the optical circuit of the second embodiment are equivalent, in electric circuit configuration, to two electrical paths of the first embodiment. Accordingly, similar to the optical circuit of the first embodiment, the voltage feedback to the application voltage substantially applied to the thermo-optical phase shifter of the second optical interference circuit that is subjected to the thermal crosstalk is generated at the same time. The optical circuit of the present embodiment has a configuration for reducing thermal crosstalk only by the thermal feedback.

Figure 9:
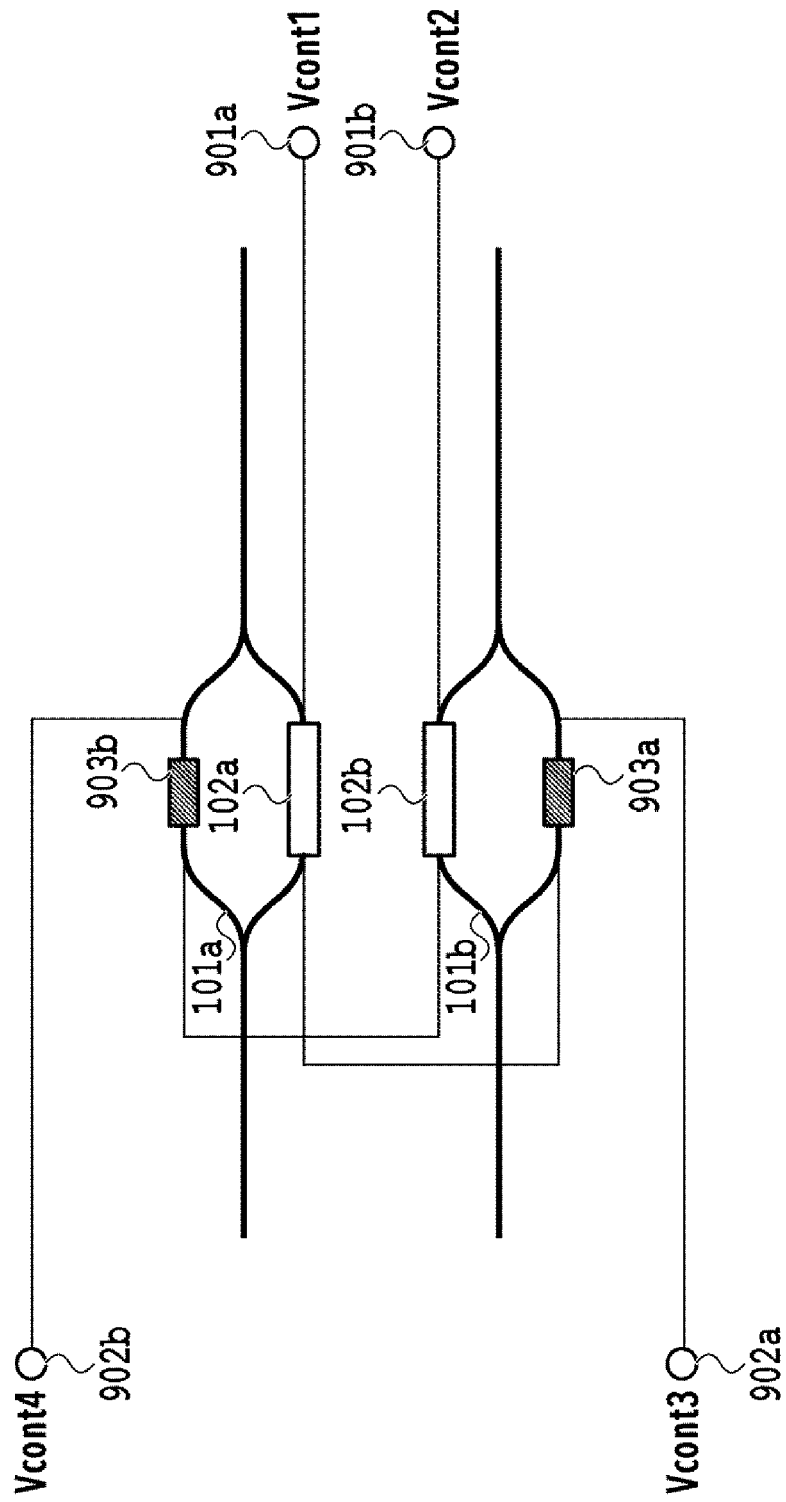
FIG. 9 is a configuration diagram illustrating an optical circuit of a third embodiment of the present disclosure.

FIG. 9 is a configuration diagram illustrating an optical circuit of a third embodiment of the present disclosure. The optical circuit of the third embodiment is similar to the optical circuits of the first embodiment illustrated in FIG. 2 and the second embodiment illustrated in FIG. 7 in that two optical interference circuits 101a and 101b are provided. Here, a configuration for reducing thermal crosstalk between the two optical interference circuits 101a and 101b will be described. Two thermo-optical phase shifters 102a and 102b are provided on neighboring arm waveguides of the two optical interference circuits, similar to the optical circuits of FIGS. 2 and 7. That is, in the drawing of the first optical interference circuit 101a, the thermo-optical phase shifter 102a is provided on a lower arm waveguide. In the drawing of the second optical interference circuit 101b, the thermo-optical phase shifter 102b is provided on an upper arm waveguide. The difference from the optical circuits of the first and second embodiments is present in the configuration of two electrical paths, which respectively include the thermo-optical phase shifters 102a and 102b. In the optical circuit of the present embodiment, two electric circuits for controlling the phase of each optical interference circuit are electrically separated and independently configured.

For the first optical interference circuit 101a, the thermo-optical phase shifter 102a and a resistor element 903a are serially connected between a voltage application terminal 901a and a voltage application terminal 902a. Similar to the second embodiment, the resistor element 903a is arranged on the arm waveguide where the thermo-optical phase shifter of the neighboring optical interference circuit 101b is not present. Similarly, for the second optical interference circuit 101b, the thermo-optical phase shifter 102b and a resistor element 903b are serially connected between a voltage application terminal 901b and a voltage application terminal 902b. The resistor element 903b is arranged on the arm waveguide where the thermo-optical phase shifter of the neighboring optical interference circuit 101a is not present. Unlike the optical circuit of the second embodiment, the two electrical paths connected to separate second voltage terminals 902a and 902b, instead of the common terminal, and are in an electrically independent state. Accordingly, the two electrical paths do not include any common part and any common resistor element, and therefore generate no voltage feedback for the substantial application voltage applied to the thermo-optical phase shifter of the neighboring optical interference circuit, unlike the optical circuits of the first and second embodiments. On the other hand, the electrical path for controlling the phase of the optical interference circuit (101a, 101b) on the thermal crosstalk giving side is configured so as to straddle the optical interference circuit (101b, 101a) on the thermal crosstalk receiving side. The thermal feedback giving resistor (903a, 903b) is arranged in the optical interference circuit (101b, 101a) on the thermal crosstalk receiving side.

Accordingly, the optical circuit of the present disclosure is the optical circuit including two or more neighboring optical interference circuits, which includes the first optical interference circuit 101a including the first thermo-optical phase shifter 102a having one end to which the first control voltage Vcont1 is applied, and the second optical interference circuit 101b neighboring the first optical interference circuit and including the second thermo-optical phase shifter 102b having one end to which the second control voltage Vcont2 is applied. Further, the optical circuit includes the first resistor 903a connected to the other end of the first thermo-optical phase shifter and arranged on the waveguide of the second optical interference circuit where the second thermo-optical phase shifter is not present, and the second resistor 903b connected to the other end of the second thermo-optical phase shifter of the first optical interference circuit and arranged on the waveguide where the first thermo-optical phase shifter is not present.

The configuration of the optical circuit illustrated in FIG. 9 can give the same phase change as the phase change generated by thermal crosstalk from one optical interference circuit by the heat generation of the resistor element in the arm waveguide having no thermo-optical phase shifter in the other optical interference circuit. Preliminarily estimating the phase change amount by thermal crosstalk and the phase change amount by the resistor element in the arm waveguide including no thermo-optical phase shifter can strictly compensate for the thermal crosstalk.

In the present embodiment, each of the thermo-optical phase shifters 102a and 102b has a resistance value of 500Ω. Each of the resistors 903a and 903b has a resistance value of 25Ω. Each of the thermo-optical phase shifters 102a and 102b has a π shift power of 15 mW. The thermal crosstalk amount from the thermo-optical phase shifter 102a to the optical interference circuit 101b is 5%.

FIG. 10 is a diagram illustrating effects of suppressing thermal crosstalk between the optical interference circuits in the optical circuit of the third embodiment. FIG. 10(a) indicates the thermal crosstalk characteristics in the conventional optical interference circuit illustrated in FIG. 1, and FIG. 10(b) indicates thermal crosstalk characteristics in the optical circuit of the third embodiment illustrated in FIG. 9. Each graph indicates influences of the control voltage Vcont1 on phase characteristics of the neighboring optical interference circuit 101b, when the control voltage Vcont1 of the voltage application terminal 903a is changed (horizontal axis) and the voltage Vcont2 of the voltage application terminal 103b is kept at constant value of 3 V. In respective electrical paths, electric potential Vcont3 of the low potential side terminal 902a and electric potential Vcont4 of the low potential side terminal 902b are ground potential. The vertical axis represents the phase of the thermo-optical phase shifter 102a of the neighboring optical interference circuit 101b, on the output side.

In an ideal state with no thermal crosstalk, the phase of the neighboring optical interference circuit 101b should be constant regardless of the control voltage Vcont1 of the voltage application terminal 103a. In reality, as illustrated in FIG. 3(a), in a region where the control voltage Vcont1 is large, the phase of the neighboring optical interference circuit 101b causes a deviation of 0.6 rad (corresponding to thermal crosstalk 5%) due to the influence of thermal crosstalk. On the other hand, the optical circuit of the third embodiment illustrated in FIG. 10(b) suppresses the deviation amount in phase of the neighboring optical interference circuit 101b to 0.1 rad or less (corresponding to thermal crosstalk 0.1% or less). As described above, the optical circuit of the third embodiment can strictly cancel the thermal crosstalk when the ratio of the resistance value of the thermo-optical phase shifter in one optical interference circuit to the resistance value of the resistor in the other optical interference circuit is equal to the thermal crosstalk amount. Since the thermal crosstalk is naturally smaller than 100%, the resistance value of the resistor element of the optical interference circuit on the thermal crosstalk receiving side should be set to be smaller than the resistance value of the thermo-optical phase shifter in the optical interference circuit on the thermal crosstalk giving side.

In all the above-described embodiments, the voltages of the voltage application terminals and the common terminals are mere examples. It is needless to say that various voltage values are applicable so as to realize a desirable phase control for the thermo-optical phase shifter of the optical interference circuit. As long as predetermined voltages can be applied to the voltage application terminal and the common terminal, the voltage of the common terminal may be any of a positive voltage, a ground voltage, and a negative voltage.

In the second and third embodiments, exemplary configurations of two optical interference circuits have been illustrated. However, the ring-type optical interference circuit being the first modified example of the first embodiment can be applied to each of the second and third embodiments. Further, the configuration in which the number of parallel optical interference circuits in the second and third modified examples is increased can be applied to each of the second and third embodiments. Further, in each of the exemplary configurations, the thermo-optical phase shifter has been described as a single resistor. However, it may be replaced by a plurality of resistors. The materials and manufacturing methods of the thermo-optical phase shifters and the resistor elements are not limited to the above-described examples, as long as the refractive index of the waveguide can be changed by heat generation.

The optical circuit of the present disclosure can greatly improve the problem of thermal crosstalk. This can contribute to downsizing and capacity enlargement of optical transmission/reception devices for realizing various signal processing functions, as well as optical attenuators.

INDUSTRIAL APPLICABILITY

The present invention can be used for communications, and more specifically, can be used for optical communications.

The invention claimed is:

1. An optical circuit including two or more neighboring optical interference circuits, comprising:
   a first optical interference circuit including a first thermo-optical phase shifter having one end to which a first control voltage is applied;
   a second optical interference circuit neighboring the first optical interference circuit and including a second thermo-optical phase shifter having one end to which a second control voltage is applied; and
   a resistor element connected to the other end of the first thermo-optical phase shifter and the other end of the second thermo-optical phase shifter, through which a current from each of the first thermo-optical phase shifter and the second thermo-optical phase shifter flows toward a common potential.

2. The optical circuit according to claim 1, wherein the first optical interference circuit and the second optical interference circuit are Mach-Zehnder interferometers, and the first thermo-optical phase shifter and the second thermo-optical phase shifter are provided on neighboring waveguides.

3. The optical circuit according to claim 2, wherein the resistor element is a single resistor, and a first electrical path between the first control voltage and the common potential and a second electrical path between the second control voltage and the common potential are shared by the single resistor.

4. The optical circuit according to claim 2, wherein
   the resistor element comprises two resistors, the two resistors being arranged on a waveguide where the first thermo-optical phase shifter is not present and a waveguide where the second thermo-optical phase shifter is not present, respectively, and
   a first electrical path between the first control voltage and the common potential and a second electrical path between the second control voltage and the common potential are shared by the two resistors, respectively.

5. The optical circuit according to claim 1, further comprising:
   a first voltage terminal to which the first control voltage is applied, and
   a second voltage terminal to which the second control voltage is applied.

6. An optical circuit including two or more neighboring optical interference circuits, comprising:
   a first optical interference circuit including a first thermo-optical phase shifter having one end to which a first control voltage is applied;
   a second optical interference circuit neighboring the first optical interference circuit and including a second thermo-optical phase shifter having one end to which a second control voltage is applied;
   a first resistor connected to the other end of the first thermo-optical phase shifter and arranged on a waveguide where the second thermo-optical phase shifter is not present, the waveguide being in the second optical interference circuit; and
   a second resistor connected to the other end of the second thermo-optical phase shifter and arranged on a waveguide where the first thermo-optical phase shifter is not present, the waveguide being in the first optical interference circuit.

7. The optical circuit according to claim 6, wherein the first optical interference circuit and the second optical interference circuit are Mach-Zehnder interferometers, and the first thermo-optical phase shifter and the second thermo-optical phase shifter are provided on neighboring waveguides.

8. The optical circuit according to claim 7, wherein resistance values of the first resistor and the second resistor are smaller than resistance values of the first thermo-optical phase shifter and the second thermo-optical phase shifter.

9. The optical circuit according to claim 6, wherein resistance values of the first resistor and the second resistor are smaller than resistance values of the first thermo-optical phase shifter and the second thermo-optical phase shifter.

10. The optical circuit according to claim 6, further comprising:
    a first voltage terminal to which the first control voltage is applied, and a second voltage terminal to which the second control voltage is applied.

* * * * *